Sept. 27, 1955 T. S. FJALSTAD 2,718,907
ADJUSTABLE GUIDE FOR PORTABLE POWER SAW
Filed April 14, 1953 2 Sheets-Sheet 1

INVENTOR.
Torkel S. Fjalstad
BY
McMorrow, Berman + Davidson
ATTORNEYS

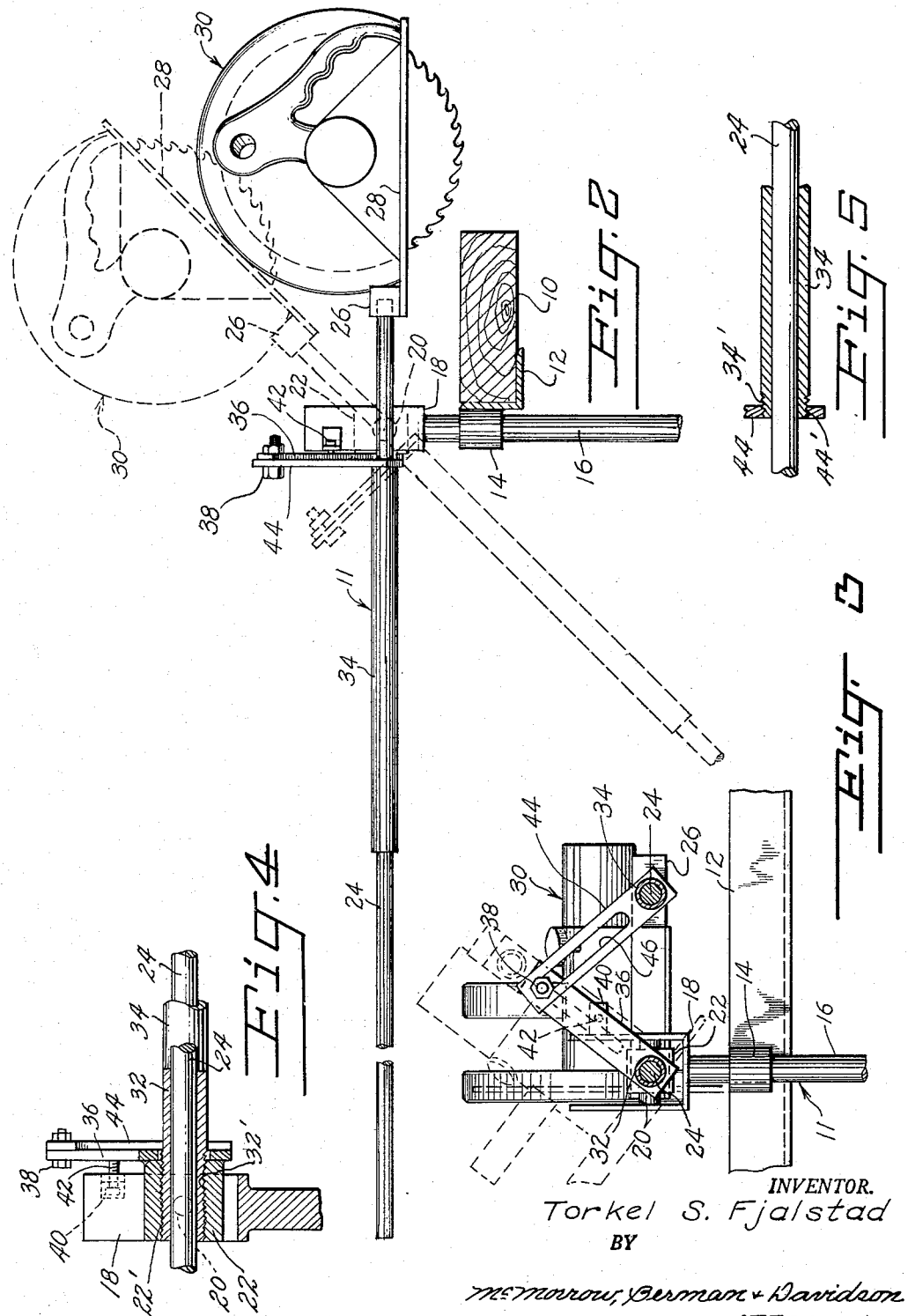

United States Patent Office 2,718,907
Patented Sept. 27, 1955

2,718,907
ADJUSTABLE GUIDE FOR PORTABLE POWER SAW

Torkel S. Fjalstad, Eugene, Oreg.

Application April 14, 1953, Serial No. 348,732

3 Claims. (Cl. 143—6)

This invention relates to a guide device for portable power saws, and more particularly, has reference to a device of the type stated which is adapted for properly supporting a saw in position for making bevel, miter, or square cuts, or any combination thereof.

While it is not broadly new to provide a saw guide that will support and properly guide a portable power saw during the making of cuts of the character stated, many of the structures which have been previously conceived for this purpose are, it is believed, undesirably complex, weighty, and expensive. Accordingly, one important object of the present invention is to provide a guiding device as stated which will be capable of manufacture at relatively low cost, will be adapted to be set up in a minimum amount of time and with minimum difficulty, and will be usable with relatively little effort and skill on the part of worker.

Another object of importance is to provide a device as stated which will be so designed as to guide the saw with full accuracy, regardless of the type of cut being made.

Yet another object is to provide a saw guide as described which will be usable with any of various conventional saws, without requiring modification or redesign of said saws.

Still another object of importance is to provide a saw guide as described which can be adjustable bodily to an inoperative position with little difficulty, whenever a piece of stock is to be inserted in position below the saw guide, or is to be removed after having been cut.

Yet another object of importance is to provide a saw guide which will be light, while yet being sturdy, so as to be capable of doing work which ordinarily would require a larger guide assembly; will be relatively inexpensive in comparison with other units for the same purpose; will permit the power saw to be detached from the guide whenever desired; and will be substantially trouble free in operation.

Other objects will appear from the following description, the claims appended thereto, and from the annexed drawings, in which like reference characters designate like parts throughout the several views, and wherein:

Figure 2 is a side elevational view of the guide in which an associated support means has been illustrated in cross section, the dotted lines indicating the position to which the device is swingable when the stock is being inserted or removed;

Figure 3 is a transverse sectional view taken substantially on line 3—3 of Figure 1, the dotted lines indicating the tilt of the plane of the rod when the assembly has been swung for bevel cutting;

Figure 4 is a sectional view taken on the line 4—4 of Figure 1; and

Figure 5 is a sectional view taken on the line 5—5 of Figure 1.

Figure 1:
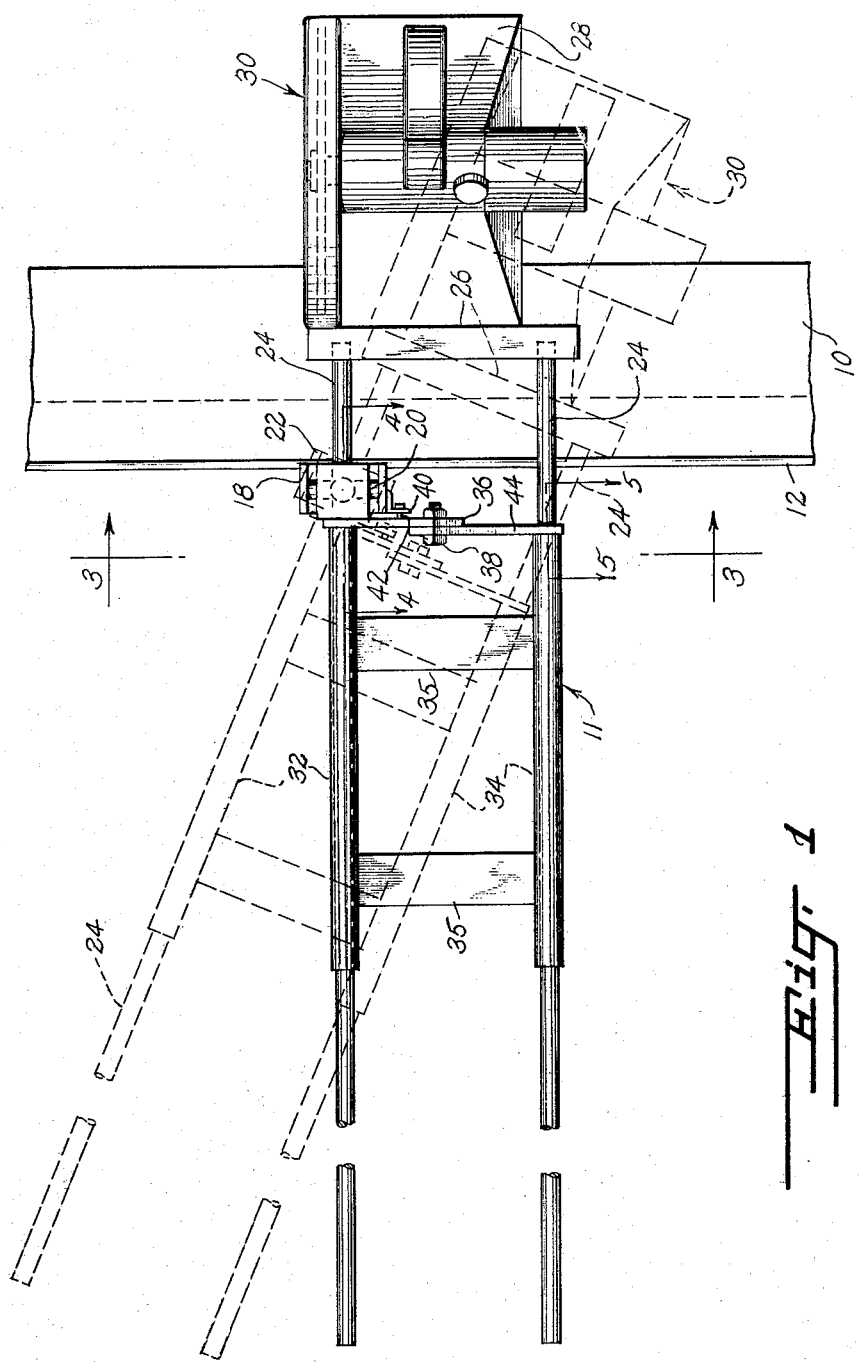
Figure 1 is a top plan view of a saw guide formed in accordance with the present invention, the dotted lines indicating one position to which the guide can be swung for the purpose of making a miter cut.

The reference numeral 10 designates a support, which in the present instance comprises an elongated plank. It will be understood, in this regard, that the length of the plank will be varied as desired, it being mainly important that the plank afford a firm base for a piece of wood stock, not shown, to be cut. The piece of wood stock, as will be appreciated, would be supported upon the upper surface of the plank, and would extend longitudinally of the plank. Of course, suitable means, such as cleats, could be nailed or otherwise secured to the plank at any desired location, for the purpose of locating the piece of wood stock properly relative to the saw to be used in cutting the same. In other words, if a large number of boards are to be cut identically to one another, stop means could be provided upon the support 10, which will insure that all the boards would be cut to the same length, without requiring individual measurement of each board.

In any event, secured to the support 10 is the guide device constituting the present invention, said guide device being designated generally by the reference numeral 11.

The guide includes a support flange 12, formed from a suitable length of angle iron material, said support flange being bolted or otherwise fixedly secured to one edge portion of the support 10. Welded or otherwise fixedly attached to the upstanding leg of the flange 12, intermediate opposite ends of said flange, is a vertically disposed sleeve 14, and swiveled in said sleeve is a support post 16.

The post 16, of course, may be provided with set collars or similar devices, to hold the post against movement in the direction of its length, relative to the sleeve 14, from any position to which the post is adjusted within the sleeve. In other words, the post 16 can be adjusted upwardly or downwardly, as desired, and this would have the effect of positioning the remaining parts of the guide assembly at selected elevations relative to the top surface of the support 10. In each position to which the post is so adjusted, the post can be retained, while still being permitted rotatable movement within its associated sleeve 14.

Welded to the upper end of post 16 is the bight of a U-shaped yoke 18, between the legs of which is disposed a pivoted block 22, said block 22 swinging within a vertical plane, and being provided, at opposite sides thereof, with outwardly extended trunnions 20 journaled in suitable openings formed in said legs of the yoke.

Thus, the block 22 can be rotatably adjusted about the axis defined by the trunnions 20, to selected positions, for the purpose of tilting the guide assembly about a transverse axis, between operative and inoperative positions, in a manner to be presently made apparent.

Extending normally to the axis of pivotal movement of the block, is an elongated, straight rod 24, said rod 24 being secured at one end to one end of a connecting bar 26 (Figure 1). Bar 26 extends transversely of the guide assembly, and secured to the other end of said bar 26 is a second rod 24, formed identically to the first rod. Rods 24 are spaced transversely of and are extended in parallelism with one another.

The bar 26 has connected thereto a bed plate 28, and supported upon said bed plate is a conventional portable power saw designated generally by the reference numeral 30. It will be understood, in this regard, that the saw 30 could be merely supported upon the plate 28, if desired. Alternatively, the saw 30 could be bolted or otherwise fixedly connected to said plate. Of course, it is desirable that the saw be removable from the plate 28, whenever desired, thus to permit use of the saw separately from the guide device constituting the present invention.

A first guide tube has been designated by the reference numeral 32, the rod 24 first described herein being slidable within said tube. A second guide tube 34 is coextensive with and is parallel to the first guide tube, the other rod 24 being slidably mounted in said tube 34.

Therefore, the saw 30, when shifted transversely of support 10 during making of a cut, causes the rods 24 to slide within their associated tubes 32, 34, so that said guide tubes will properly guide the saw during its traverse of the stock.

The respective tubes 32, 34 are connected in transversely spaced, parallel relation by cross bars 35, said cross bars being welded at their opposite ends to the respective tubes, and being spaced longitudinally of the tubes.

Means is embodied in the invention for permitting bevel cuts to be made, and to this end, a stationary support bar 36 has an opening at its lower end receiving the guide tube 32, the support bar or member 36 being fixedly connected at its lower end to the block 22. The support bar or member 36 is inclined upwardly and laterally relative to the tube 32 and is disposed normally to the length of the tube.

At its upper end, the member 36 is provided with a clamp bolt 38. An angle bracket 40 is secured to one leg of the yoke 18, and rotatably supported in a leg of the bracket 40 is a threaded bolt 42, the bolt 42 being contractible with the member 36 and serving as an adjustable stop.

It will thus be seen that the member 36 is held in a stationary position, to provide a base to which can be secured a movable bar member 44. Member 44 has a longitudinal slot 46, receiving the clamp bolt 38, said member 44 also being formed with an opening at one end receiving the rod 24.

The tube 32, Figure 4, is rotatably supported in the block 22, as by the external threaded portion 32′ on the said tube being in threaded engagement with the threaded opening 22′ in the block 22, and the tube 34, Figure 5, is rotatably supported in the bar member 44 as by the external threaded portion 34′ being in threaded engagement with a threaded opening 44′ formed in the bar member 44.

By reason of the construction illustrated and described, it will be apparent that that rod 24 shown at the right in Figure 3 can be swung bodily through an arcuate path, in a counterclockwise direction as viewed in Figure 3, about an axis defined by the other rod 24. In each position to which the right hand rod 24 is swung, a nut threaded upon the bolt 38 can be tightened, to hold the member 44 against movement relative to the member 36, thereby to retain the selected adjustment.

This adjustment will cause the entire guideway defined by tubes 32, 34, to be tilted transversely, thus causing corresponding transverse tiltable adjustment of the saw 30. As a result, the saw blade will be inclined out of a vertical plane, thus to permit a bevel cut to be made when the saw traverses the piece of wood stock.

If it is desired that a miter cut be made, the entire device can be swung about an axis defined by the post 16, and could be swung, for example, to the dotted line position shown in Figure 1. Of course, the extent to which the device is horizontally swung for making miter cuts will be determined by the particular angle of the cut to be made. A suitable protractor means or the like could, I believe, be embodied in the construction to facilitate the determination of the necessary angles, it being considered that a protractor device of this type is, per se, sufficiently conventional as not to require special illustration.

In any event, to make a miter cut, it is merely necessary that the device be swung about the axis of the post 16.

When a square cut is to be made, the parts will be positioned in the full line location shown in Figure 1, and it will be apparent that when the parts are so disposed, movement of the saw 30 to the left in Figure 1 will cause a cut to be made transversely of the stock, at right angles to the longitudinal center line of said stock.

If a piece of stock is to be inserted or removed, the saw can be tilted upwardly to the dotted line position shown in Figure 2, the saw being pivoted about the axis defined by the trunnions 20. This causes the right hand end of the device, viewing the device as in Figure 2, to be lifted upwardly, thereby to provide clearance therebelow facilitating insertion or removal of the stock.

As previously noted, bevel cuts can be made by swinging one of the guide rods 24 upwardly through an arcuate path, about an axis defined by the other guide rod.

Of course, bevel cuts can be made in combination with other cuts, such as square or miter cuts. Similarly, any other combination of cuts can be effected, as described.

The invention, it is thought, has certain important characteristics, which are believed worthy of note at this point. The device is very light, and readily portable, and obviously, can be set up or dismantled in a minimum amount of time. Further, the saw 30 can be removed from the remaining parts of the device with ease, and the entire saw can be lifted from the bed plate 28, if cuts are to be made without using the guide.

Further, the construction illustrated and described is such as to permit adjustment of the guideway defined by the spaced tubes 32, 34, to be carried out with ease, said guideway being horizontally swingable, and being also tiltable within a vertical plane. The guideway, further, is tiltable about an axis extending transversely thereof, for adjustment of the parts to operative and inoperative positions respectively.

Still further, the construction which I have illustrated and described above is quite inexpensive, considering the benefits to be obtained from the use thereof, and is adapted to permit any of various conventional power saws to be used in association therewith, without requiring modification or redesign of said saws.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A saw guide comprising a pair of spaced, parallel guide rods having means at one end for fixedly connecting the same to a portable power saw in line with the blade of said saw; spaced guide members having a fixed connection to one another and in which said rods are slidably mounted, for traverse of a work piece by said saw; a post; an upstanding yoke fixed to said post; and a block mounted in said yoke for pivotal adjustment about a horizontal axis; one of said guide members being rotatable in said block and the other of said guide members being connected to said one guide member to move with it; said pivotal adjustment of the block being effective for tilting the guide rods about an axis extending transversely thereof for swinging said saw upwardly and downwardly between inoperative and operative positions respectively.

2. A saw guide comprising a pair of spaced, parallel guide rods having means at one end for fixedly connecting the same to a portable power saw in line with the blade of said saw; spaced guide members having a fixed connection to one another and in which said rods are slidably mounted, for traverse of a work piece by said saw; a block in which one of said guide members is rotatable; a yoke on which said block is mounted for pivotal adjustment about a horizontal axis, said pivotal adjustment of the block being effective for tilting the guide rods about an axis extending transversely thereof, for swinging said saw upwardly and downwardly between inoperative and operative positions respectively; a post depending vertically from the yoke; and a sleeve in which said post is rotatable to effect horizontal, swingable adjustments of the guide rods and saw for making miter cuts, said sleeve having means associated therewith for fixedly attaching the same to a support on which a work piece to be cut may be disposed.

3. A saw guide comprising a pair of spaced, parallel guide rods having means at one end for fixedly connecting the same to a portable power saw in line with the blade of said saw; spaced guide members having a fixed connection to one another and in which said rods are slidably mounted, for traverse of a work piece by said saw; a block in which one of said guide members is rotatable; a yoke on which said block is mounted for pivotal adjustment about a horizontal axis, said pivotal adjustment of the block being effective for tilting the guide rods about an axis extending transversely thereof, for swinging said saw upwardly and downwardly between inoperative and operative positions respectively; a post depending vertically from the yoke; a sleeve in which said post is rotatable to effect horizontal, swingable adjustments of the guide rods and saw for making miter cuts, said sleeve having means associated therewith for fixedly attaching the same to a support on which a work piece to be cut may be disposed; and means for bodily swinging the other guide member about an axis defined by said one guide member, for tilting said saw transversely to make bevel cuts, said last-named means comprising a stationary clamp bar fixedly connected to said block and through which said one guide member extends, and a movable clamping bar connected to the other guide member and having a slidable, pivotal connection to the first-named clamp bar, said second-named clamp bar being adapted to be fixedly connected to the first-named clamp bar in selected positions to which it is slidably and pivotally adjusted relative to said first-named clamp bar.

References Cited in the file of this patent

UNITED STATES PATENTS

| | | |
|---|---|---|
| 1,522,604 | Torlinski | Jan. 13, 1925 |
| 1,638,122 | Jull | Aug. 9, 1927 |
| 1,756,161 | Hedgpeth | Apr. 29, 1930 |
| 2,120,897 | Miller | June 14, 1938 |
| 2,596,524 | Bridwell | May 13, 1952 |
| 2,602,474 | Truchan | July 8, 1952 |
| 2,620,835 | Barnhart | Dec. 9, 1952 |
| 2,627,287 | McCluskey | Feb. 3, 1953 |